United States Patent [19]

Abraham et al.

[11] Patent Number: 5,166,009
[45] Date of Patent: Nov. 24, 1992

[54] MIXED POLYMER ELECTROLYTE AND MIXED POLYMER ELECTROLYTE BATTERY

[75] Inventors: Kuzhikalail M. Abraham, Needham; Mohamed Alamgir, Dedham, both of Mass.

[73] Assignee: The United States of America as represented by the Secretary of the Navy, Washington, D.C.

[21] Appl. No.: 676,507

[22] Filed: Mar. 28, 1991

[51] Int. Cl.$^5$ ............................................. H01M 10/40
[52] U.S. Cl. ..................................... 429/192; 252/62.2
[58] Field of Search ......................... 429/192; 252/62.2

[56] References Cited

U.S. PATENT DOCUMENTS 4,737,422  4/1988  Knight et al. ......................... 429/192
5,064,548  11/1991  Roggero et al. ................. 429/192 X

OTHER PUBLICATIONS

Journal of Electrochemical Society, vol. 136, No. 12, Dec. 1989 by K. Abraham, M. Alamgir and R. K. Reynolds.

Primary Examiner—Stephen Kalafut
Attorney, Agent, or Firm—James T. Busch; Thomas E. McDonald; A. F. Kwitnieski

[57] ABSTRACT

A mixed polymer electrolyte and a solid rechargeable battery which uses a solid mixed polymer electrolyte of poly[bis(methoxyethoxyethoxide)phosphazene].

12 Claims, 5 Drawing Sheets

MIXED POLYMER ELECTROLYTE AND MIXED POLYMER ELECTROLYTE BATTERY

BACKGROUND OF THE INVENTION

1. Field of Invention

This invention relates to a mixed polymer electrolyte and to a battery which utilizes a mixed polymer electrolyte.

2. Description of Prior Art

The field of polymer electrolytes is experiencing vigorous activities in recent times due to significant theoretical interests as well as practical importance for the development of solid-state rechargeable Li batteries, sensors and electrochomic devices. A part of the current effort is concerned with development of polymer electrolyte-based high energy denisty solid-state Li batteries. The classical polymer electrolytes are composed of complexes of poly-(ethylene oxide), or PEO, with Li sales. The low conductivity, i.e.. $<10^{-7} \Omega^{-1}$, $cm^{-1}$, of these polyolefin electrolytes at room temperature has limited their use to batteries operating at relatively high timepratures of about 100° C. The low conductivity has also been a factor contributing to excessive dendritic growth, and consequent shorting, in Li/TiS$_2$ abd Li/V$_6$O$_3$ cells during cycling.

However, since the discovery that Li+ conductivity in the complexes of Li salts with inorganic polymers poly[bis(methoxyethoxyethoxide)phosphazene], or MEEP, is 2-3 orders of magnitude higher than that in the corresponding complexes of poly(ethylene oxide) (PEO), attempts have been made to utilize them in all-solid state Li batteries. A drawback of MEEP-$(LiX)_n$ complexes is that at room temperature and above they are glutinous materials and slowly flow under pressure. This lack of dimensional stability of MEEP-based electrolytes has hindered their application in practical Li batteries and other solid-state devices. Several approaches have been pursued to enhance the mechanical properties of MEEP. These include chemical crosslinking of MEEP with poly(ethylene glycol), irradiation of MEEP or MEEP-$(LiX)_{0.25}$ complexes with various doses of $^\alpha$Co γ-ray, and the use of a porous, fiberglass support-matrix.

Other attempts to improve the dimensional stability of MEEP-$(LiX)_n$ complexes have consisted of blending MEEP with high molecular weight PEO. Free-standing thin films with a slightly lower conductivity than that of MEEP-$(LiX)_n$ could easily be cast from these blends.

Mixed polymer electrolytes composed of Li salt complexes of poly[bis-(methoxyethoxyethoxide)phosphazene], called MEEP, and poly(ethylene oxide), known as PEO, have shown excellent dimensional stability and high conductivity MEEP/PEO-$(LiX)_n$ mixed polymer electrolytes, in which LiX = LiBF$_4$ and LiClO$_4$, have exhibited conductivities at 60° C. which are comparable to the conductivity of PEO-$(LiX)_n$ at 100° C. Furthermore, the conductivity of these mixed electrolytes at room temperature is about 500-fold better than that of PEO-based electrolytes. These will translate into higher rate capability and/or lower temperature of operation for solid-state Li cells containing these mixed electrolytes Complexes containing LiAsF$_6$, LiAlCl$_4$, or LiCF$_3$SO$_3$, exhibited lower conductivities than those containing LiBF$_4$ or LiClO$_4$. The higher conductivity of the mixed electrolytes compared to PEO complexes may be attributed to the higher degree of amorphous character introduced by the presence of MEEP.

A discussion of these mixed polymer electrolytes and the experimental test results which were obtained can be found in *Journal of Electrochemical Society*, Vol. 136, No. 12, December 1989 by K. M. Abraham, M. Alamgir and R. K. Reynolds.

SUMMARY OF INVENTION

Li salt complexes of poly(propylene oxide), designated PPO-$(LiX)_n$, due to their lower conductivity, have received far less attention than their PEO-$(LiX)_n$ counterparts. Polymer electrolytes based on PPO, however, can offer advantages over those based on PEO, since the former polymer, unlike PEO, is predominantly an amorphous material. Like MEEP-$(LiX)_n$ or PPO-$(LiX)_n$, composite electrolytes derived from mixtures of MEEP and PPO would be fully amorphous while being dimensionally more stable than the individual polymer electrolytes One embodiment of the invention consists of a mixed polymer electrolyte which utilizes the above characteristics.

Another embodiment of the invention consists of a battery which utilizes mixed polymer electrolytes generally described by MEEP/PPO-$(LiX)_n$. Such a battery can be recharged, is leakage free, and can be stored for long periods of time without suffering substantial reduction in capacity. Also, the use of the solid electrolytes as further described and claimed allows very great flexibility in the shape and size of the batteries in which the may be employed. The invention also comtemplates a mixed polymer electrolyte which could find utility in other devices such as in sensors and electrochromic devices.

DETAILED DESCRIPTION OF THE INVENTION

Figure 1:
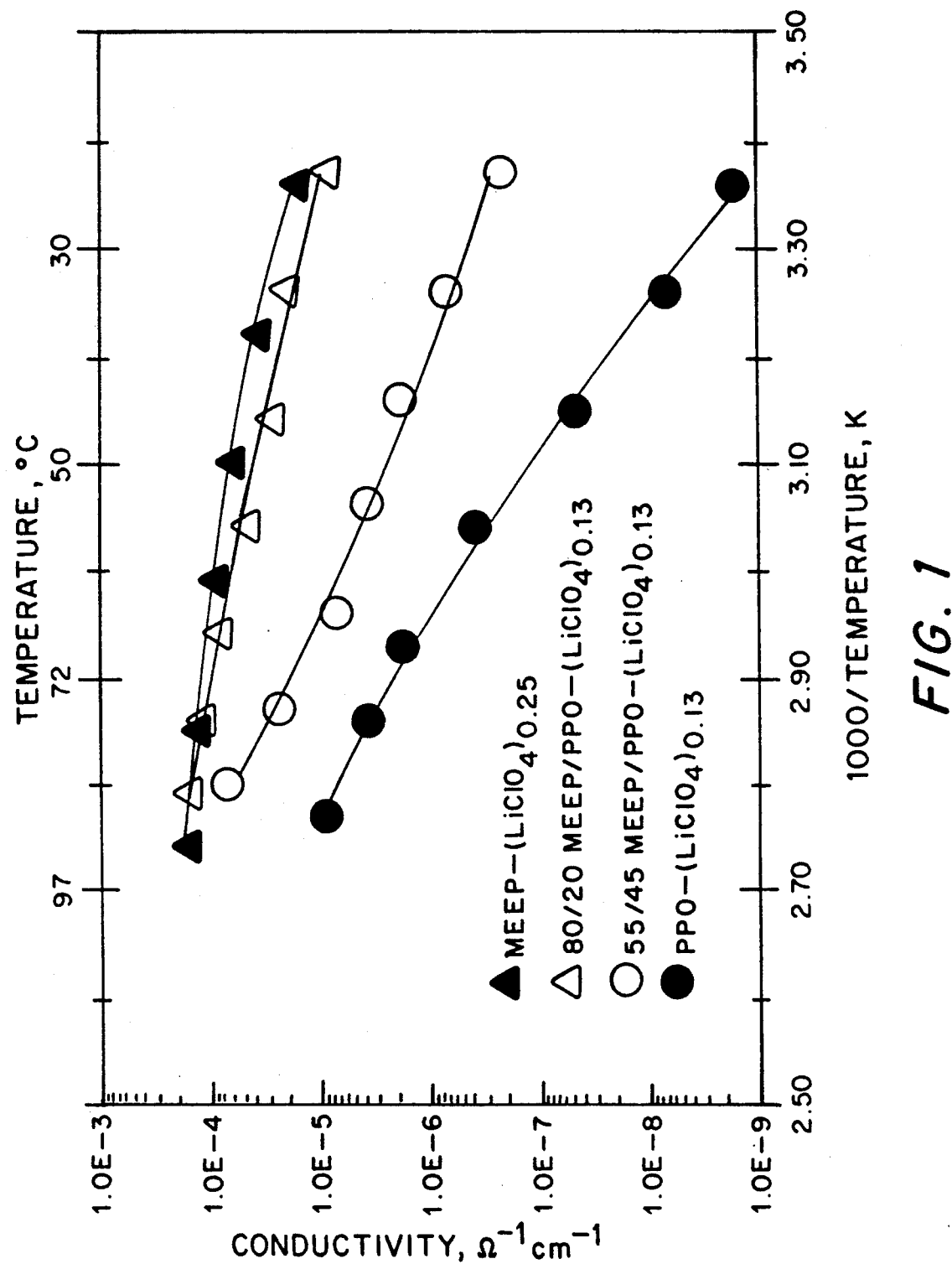
FIG. 1. Compares the conductivities of MEEP/PPO-$(LiClO_4)_{0.13}$ electrolytes on the ratio of the polymers.

According to the invention, a rechargeable lithium battery is provided with a solid mixed polymer electrolyte generally described by MEEP/PPO-(LiX) where MEEP = poly[bis(methoxyethoxy ethoxide)phosphazene],PPO = poly(propylene oxide) and LiX = -LiBF$_4$, LiClO$_4$, LiCF$_3$SO$_3$,LiAsF$_6$ or LiAlCl$_4$. The addition of PPO in various proportions to MEEP-$(LiX)_n$ electrolytes significantly improves the latter's dimensional stability but causes only a slight decrease in its conductivity The conductivities of these mixed polymer electrolytes are much higher than that of PPO-$(LiX)_n$. The Li+ transport number in MEEP/PPO-$(LiX)_{0.13}$ electrolytes, with LiX = LiBF$_4$ or LiClO$_4$, was determined to be between 0.3 and 0.5. Differential scanning calorimetric data established the predominantly amorphous nature of the mixed polymer complexes. Cyclic voltammetric studies of these electrolytes at a stainless steel electrode indicated a stability domain between 1 and 4.5 V (vs.Li+/Li), and established the good Li plating and stripping efficiency in these electrolytes.

The idealized structure of PPO used is given as:

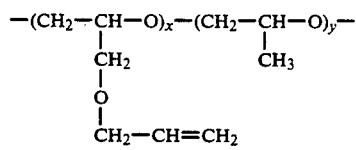

Although it is a copolymer of propylene oxide and allyl glycidyl ether, the latter constitutes only about 5 weight percent (w/o) of the polymer, or $$\frac{x}{y} = 0.03.$$

When dissolved in acetonitrile, mixtures of PPO and MEEP form homogeneous solutions both in the absence and presence of Li-salts. Uniform thin films could be cast readily from such solutions containing MEEP and PPO in all proportions. Interestingly, the behavior of MEEP/PPO-$(LiX)_n$ solutions is very much different from that of MEEP/PEO-$(LiX)_n$ referred to earlier. In the latter case, homogeneous mixed polymer films were formed only for polymer ratios in which MEEP content was less than or equal to about 70 weight-percent. At higher MEEP concentrations, the polymer blend underwent phase separation when cast into films Such films revealed isolated and visually distinguishable regions of PEO and MEEP. On the other hand, MEEP/PPO mixtures of all ratios form films of apparently homogeneous morphology. However, films containing very high proportions of MEEP ( 80 weight-percent and higher) exhibit inadequate mechanical properties and are difficult to handle.

Conductivities of the mixed electrolytes MEEP/PPO-$(LiX)_n$, where the subscript n is the Li+to 0 mole ratio, with one oxygen from PPO and four oxygens from MEEP taking part in the complexation, were determined by varying both the salt concentration and the ratio of the polymers With respect to the latter, two polymer compositions i.e., 55 w/o MEEP:45 w/o PPO and 80 w/o MEEP:20 w/o PPO, were examined in combination with a number of lithium salts. The effect of salt concentration on conductivity was determined using $LiBF_4$ and $LiClO_4$. The remaining salts, $LiCF_3SO_3$, $LiAlCl_4$ and $LiAsF_6$, were employed only in one concentration. The polymer concentration of the salt in these latter electrolytes is selected in such a way that PPO and MEEP would form complexes of the stoichiometries $(PPO)_8LiX$ and $(MEEP)_4LiX$, respectively. These stoichiometries, because of their optimal conductivity, have generally been the most widely used ones in the two parent electrolytes.

FIG. 1 compares the conductivity, determined from the impedance data, of 55 w/o MEEP:45 w/o PPO-$(LiClO_4)_{0.13}$, hereafter referred to as 55/45 MEEP/PPO-$(LiClO_4)_{0.13}$, with that of 80/20 MEEP/PPO-$(LiClO_4)_{0.13}$, in the temperature range between 20° C. and 90° C. Conductivities at selected temperatures for several electrolytes are listed in Table 1 below.

TABLE 1

CONDUCTIVITIES OF MEEP/PPO-$(LiX)_n$ ELECTROLYTES AT DIFFERENT TEMPERATURES

| Complex | Conductivity (ohm$^{-1}$cm$^{-1}$) | |
| --- | --- | --- |
|  | 25° C. | 50° C. |
| 80/20 MEEP/PPO-$(LiClO_4)_{0.13}$ | $9.0 \times 10^{-6}$ | $7.0 \times 10^{-5}$ |
| 80/20 MEEP/PPO-$(LiClO_4)_{0.26}$ | $8.0 \times 10^{-7}$ | $1.2 \times 10^{-6}$ |
| 80/20 MEEP/PPO-$(LiBF_4)_{0.13}$ | $1.1 \times 10^{-5}$ | $3.0 \times 10^{-5}$ |
| 80/20 MEEP/PPO-$(LiBF_4)_{0.26}$ | $3.2 \times 10^{-6}$ | $2.9 \times 10^{-5}$ |
| 55/45 MEEP/PPO-$(LiClO_4)_{0.13}$ | $9.0 \times 10^{-8}$ | $3.5 \times 10^{-6}$ |
| 55/45 MEEP/PPO-$(LiBF_4)_{0.13}$ | $4.0 \times 10^{-7}$ | $6.3 \times 10^{-6}$ |

The data presented here represent an average of measurements with at least two different samples. It is apparent from FIG. 1 that the conductivity of MEEP/PPO-$(LiClO_4)_{0.13}$ electrolytes is directly proportional to the amount of MEEP present. About a 50 fold increase in conductivity was achieved by raising the amount of MEEP from 55 w/o to 80 w/o. The conductivity of 80/20 MEEP/PPO-$(LiClO_4)_{0.13}$ electrolyte is very close to that of MEEP-$(LiClO_4)_{0.25}$. For example, at room temperature the conductivity of MEEP-$(LiClO_4)_{0.13}$ electrolyte. In general, an improvement of more than two orders of magnitude in conductivity over that of PPO-$(LiClO_4)_{0.13}$ was achieved with the mixed polymer electrolytes. The conductivity vs 1/T curves for these electrolytes were generally smooth and gentle, lacking the sharp transition which usually characterizes electrolytes in which the crystalline fraction of the polymer melts during heating.

It is useful to review here the mechanical properties of these electrolytes, since they are important from a practical point of view. The films obtained from 55/45 MEEP/PPO-$(LiClO_4)_{0.13}$ are sticky, but are free-standing and can be handled comfortably. Films cast from solutions of 80/20 MEEP/PPO-$(LiClO_4)_n$ behaved differently; they were very soft and their ease of handling depended on the amount of salt present. At the low salt concentrations corresponding to Li+/0 ratios of equal to or below 0.13, it was difficult to isolate the 80/20 MEEP/PPO-$(LiClO_4)_n$ electrolytes as free-standing films. Conductivity measurements on such films were carried out on the bulk electrolyte. In contrast, films prepared from the 80/20 MEEP/PPO-$(LiClO_4)_{0.18}$ electrolyte were dimensionally stable and could be handled with ease.

Figure 2:
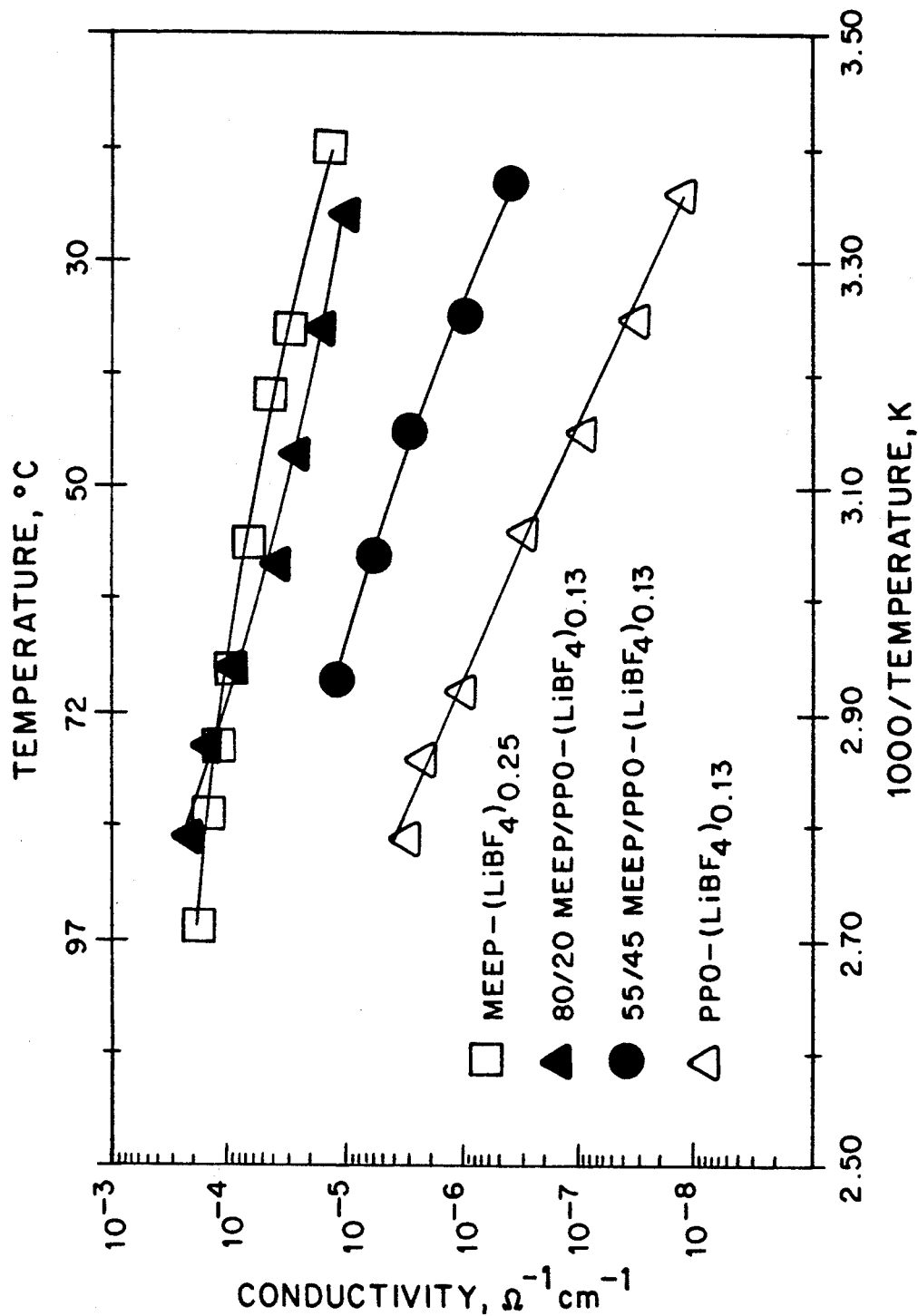
FIG. 2. Compares the conductivities of MEEP/PPO-$(LiBF_4)_{0.13}$ electrolytes on the ratio of the polymers.

Results similar to those described above were also obtained with $LiBF_4$. FIG. 2 illustrates the conductivities for the compositions 80/20 MEEP/PPO-$(LiBF_4)_{0.13}$ and 55/45 MEEP/PPO-$(LiBF_4)_{0.13}$. Clearly, from a conductivity standpoint these mixed electrolytes are much more desirable than the PPO-$(LiBF_4)_{0.13}$ electrolyte, conductivity of which is also shown in FIG. 2 for comparison.

Figure 3:
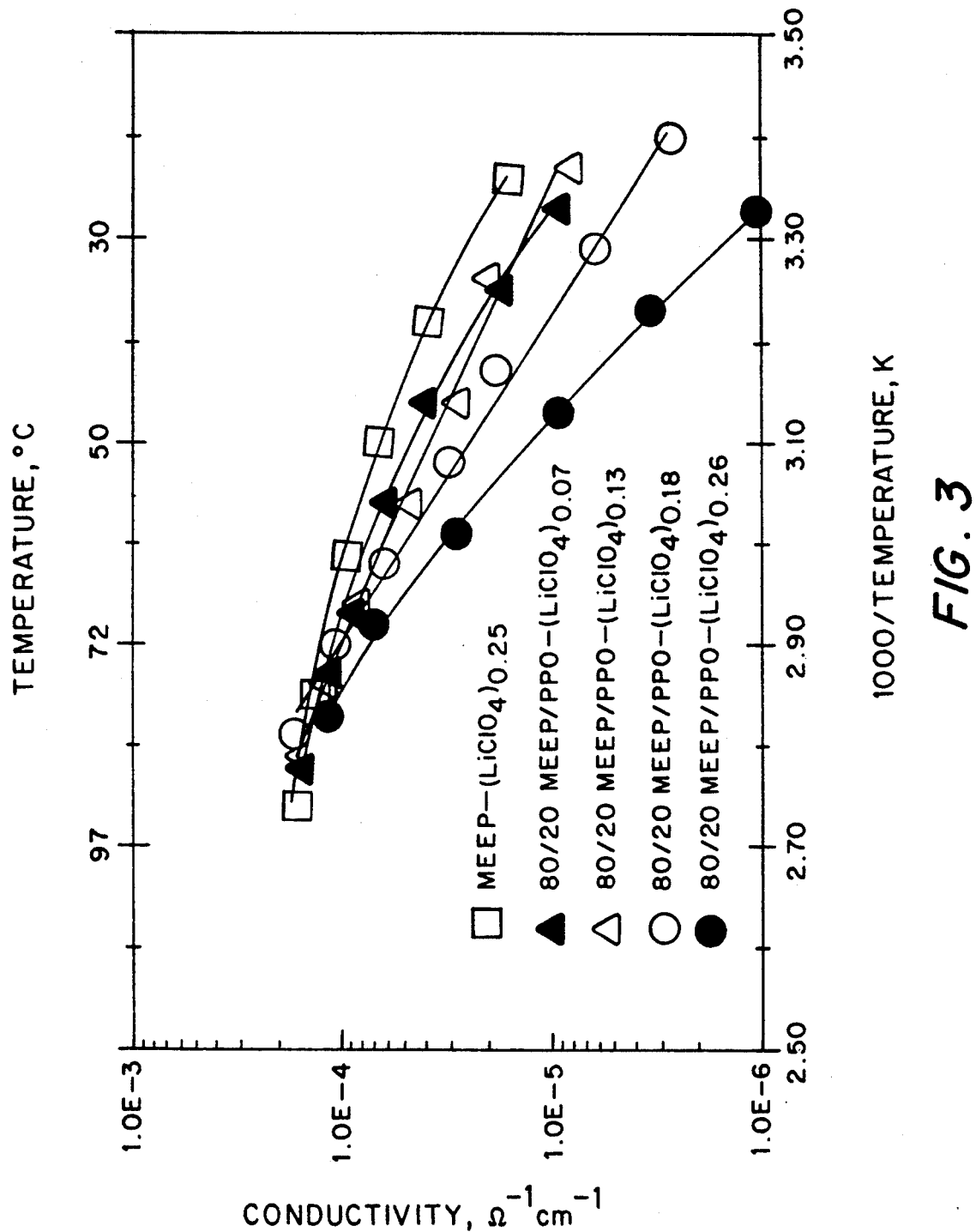
FIG. 3. Shows the dependence of conductivity on salt concentration of 80/20 MEEP/PP0-$(LiClO_4)_n$ electrolytes.

The dependence of conductivity on salt concentration is shown in FIG. 3 for the 80/20 MEEP/PPO-$(LiClO_4)$ electrolytes. The conductivity of 80/20 MEEP/PPO-$(LiClO_4)_{0.07}$ and that of 80/20 MEEP/PPO-$(LiClO_4)_{0.13}$, were similar and were close to that of pure MEEP-$(LiClO_4)_{0.25}$ electrolyte. However, as mentioned earlier, these two composite electrolytes suffered from poor dimensional stability. A further increase in the Li+/0 ratio led to a marked improvement in their mechanical properties, but with a concomitant decrease in the conductivity. The data for the 80/20 MEEP/PPO-$(LiClO_4)_{0.18}$ and 80/20 MEEP/PPO-$(LiClO_4)_{0.26}$ complexes, which possess good dimensional stability, illustrate this in FIG. 3. The reduction in ionic conductivity with increasing Li salt concentration beyond an optimum level is analogous to that observed in the pure PEO-(LiX) or PPO-(LiX)$_n$ electrolytes and can be ascribed to both ion-pairing and increased viscosity, or higher film rigidity, in concentrated Li salt/polymer solvent solutions.

Figure 4:
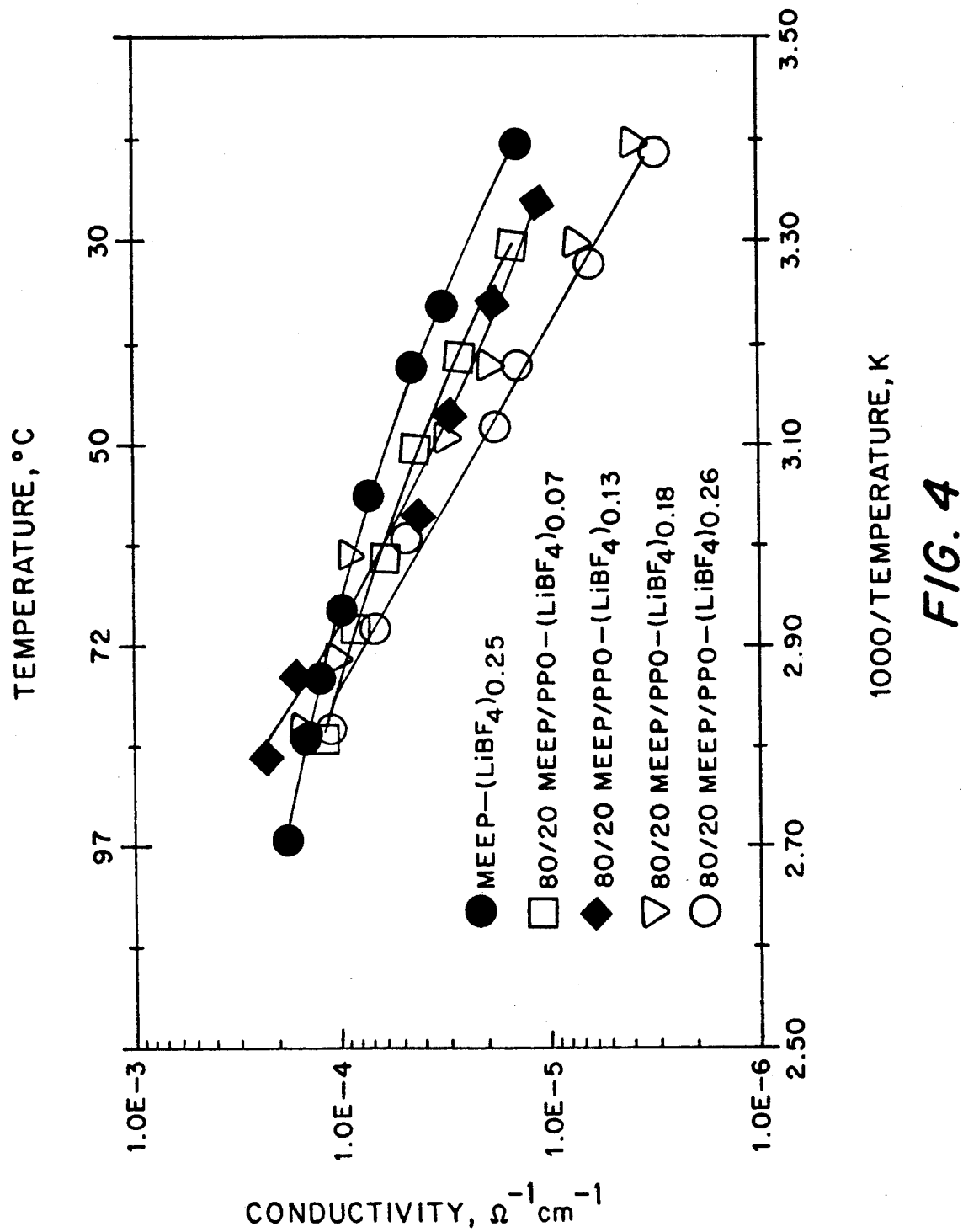
FIG. 4. Shows the dependence of conductivity on salt concentration of 80/20 MEEP/PP0-$(LiBF_4)_n$ electrolytes.

FIG. 4 shows the conductivity-temperature behavior of the 80/20 MEEP/PPO-(LiBF$_4$)$_n$ complexes for three concentrations of LiBF$_4$. Again, there is no significant difference between the conductivities of 80/20 MEEP/PPO-(LiBF$_4$)$_{0.007}$ and 80/20 MEEP/PPO-(LiBF$_4$)$_{0.13}$. However, increasing the LI+/0 ratio to 0.18 and above led to a substantial decrease in the room temperature conductivity. This drop in the conductivity was accompanied by increased stiffness of the electrolyte films.

Figure 5:
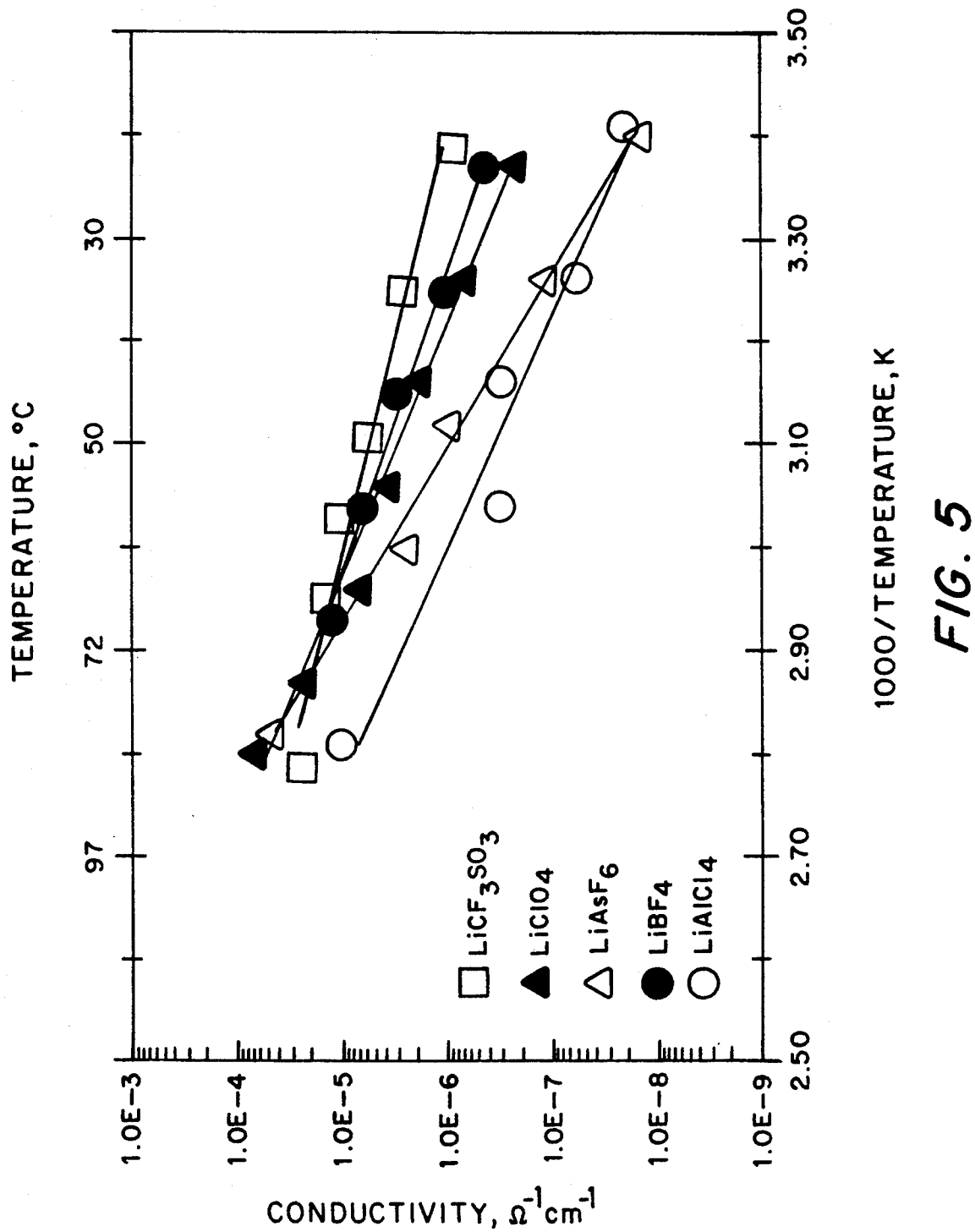
FIG. 5. Depicts the dependence of the conductivity of 55/45 MEEP/PPO-$(LiX)_{0.13}$ electrolyte on the nature of other Li salts.

We have also prepared mixed-polymer complexes of three other lithium salts, namely LiAlCl$_4$, LiCF$_3$SO$_3$ and LiAsF$_6$ and measured their conductivities (FIG. 5). The electrolyte composition for these studies was kept at 55/45 MEEP/PPO-(LiX)$_{0.13}$. The reason for choosing this composition for examining the effect of the nature of Li salt on conductivity was twofold: the resulting electrolytes had good dimensional stability, and conductivity data for the related MEEP/PEO-(LiX)$_n$ composites were available, enabling a comparison of these two types of electrolytes. As can be seen in FIG. 5, below, about 60° C., the complexes containing LiAlCl$_4$ and LiAsF$_6$ were much less conductive than those containing the other Li salts. In the present 55/45 MEEP/PPO-(LiX)$_n$ electrolytes, however, the one containing LiCF$_3$SO$_3$ appears to have the highest room temperaturee conductivity among the five salts for these particular polymer/polymer and salt/polymer ratios. The morphology of the electrolyte films containing LiAlCl$_4$ was found to be quite different from that of the remaining salts. The films obtained with LiAlCl$_4$ were stiff and to some extent brittle, whereas the electrolyte films of the remaining salts belonging to this composition were soft.

As can be seen from the above, MEEP and PPO, unlike MEEP and PEO, in combination with a series of Li salts have been found to be miscible in all proportions to yield homogeneous and uniform thin film electrolytes. Polymer electrolytes composed of MEEP/PPO mixtures and the Li salts LiBF$_4$, LiClO$_4$, LiCF$_3$SO$_3$ or LiAsF$_6$ have shown significantly higher conductivity than PPO-(LiX)$_n$ electrolytes. Conductivity of 80/20 MEEP/PPO-(LiBF$_4$)$_{0.13}$ or 80/20 MEEP/PPO-(LiClO$_4$)$_{0.13}$ at room temperature was found to be about $1.0 \times 10^{-5}$ ohm$^{-1}$cm$^{-1}$, very close to that of their pure MEEP-LiX)$_n$ analogs. However, the dimensional stability of electrolytes having this polymer ratio is sensitive to Li salt concentration with a higher salt concentration favoring better dimensional stability. Thus, an increase in the Li+/0 ratio from 0.13 to 0.18 led to an improvement in the mechanical properties of these electrolytes with a simultaneously small decrease in the conductivity. Electrolytes of the composition 55/45 MEEP/PPO-LiX)$_{0.13}$ where LiX=LiClCO$_4$, LiBF$_4$, LiCF$_3$SO$_3$ or LiAsF$_6$ were all isolated as dimensionally stable, amorphous films. Complexes of LiAlCl$_4$ with 55/45 MEEP/PEO and 55/45 MEEP/PPO showed very low conductivity.

It is contemplated that these electrolytes will be used with a lithium anode and TiS$_2$ cathode to form a solid, rechargeable battery.

It should be understood, however, that numerous modifications and variations of the present invention are possible. For example, the battery cathode could be any intercalation type metal compound such as BiS$_2$, CrS$_2$ or IrS$_2$ or other metal sulfides. Additionally, the mixed electrolyte could find utility in devices other than solid batteries, i.e., sensors and electrochromic devices.

We claim:

1. A mixed polymer electrolyte with a composition MEEP/PPO-(LiX)$_n$ where MEEP represents POLY [BiS-METHOXYETHOXYETHOXIDE) PHOSPHAZENE, PPO represents POLY (PROPYLENE OXIDE) and LiX represents a lithium salt.

2. The electrolyte of claim 1 in which LiX is LiBF$_4$, LiClO$_4$, LiCF$_3$SO$_3$, LiAsF$_6$ or LiAlCl$_4$.

3. The electrolyte of claim 2 in which the ratio of the polymers MEEP and PPO varies between 80/20 and 55/45.

4. The electrolyte of claim 3 in which the Li salt concentration (Li+)/(0) varies between 0.05 and 0.30.

5. The electrolyte of claim 1 in which LiX is LiBF$_4$ or LiClO$_4$.

6. The electrolyte of claim 5 in which the ratio of the polymers MEEP and PPO varies between 80/20 and 55/45.

7. The electrolyte of claim 6 is which the Li salt concentration varies between 0.05 and 0.30.

8. The electrolyte of claim 5 in which the ratio of the polymers MEEP and PPO is about 55/45 and the Li salt concentration is between 0.1 and 0.2.

9. A mixed polymer solid electrolyte battery comprising a positive electrode, a negative electrode and a mixed polymer solid electrolyte of MEEP/PPO-(LiBF$_4$) or MEEP/PPO-(LiClO$_4$).

10. The battery of claim 9 in which the ratio of the polymers MEEP and PPO is about 55/45 and the Li salt concentration is between 0.1 and 0.2.

11. The battery of claim 10 in which the positive electrode is lithium and the negative electrode is a metal sulfide.

12. The battery of claim 11 in which the negative electrode is TiS$_2$.

* * * * *